COMBINING AND EQUALIZING NETWORK

Filed Oct. 19, 1949 3 Sheets-Sheet 1

INVENTOR.
GUSTAV GUANELLA
BY
ATTORNEY

COMBINING AND EQUALIZING NETWORK

Filed Oct. 19, 1949 3 Sheets-Sheet 2

INVENTOR.
GUSTAV GUANELLA
BY
Karl Nau
ATTORNEY

INVENTOR.
GUSTAV GUANELLA
BY
Kurt Kau
ATTORNEY

United States Patent Office 2,700,129

Patented Jan. 18, 1955

2,700,129

COMBINING AND EQUALIZING NETWORK

Gustav Guanella, Zurich, Switzerland, assignor, by mesne assignments, to Radio Patents Company, a partnership Application October 19, 1949, Serial No. 122,157

4 Claims. (Cl. 323—83)

The present invention relates to means for and a method of maintaining a uniform current distribution in two or more alternating current circuits connected in parallel, such as a number of parallel operated vacuum tube amplifiers as used in ultra-high frequency systems or a number of load circuits fed in parallel from a single source, substantially independently of differences of or variations in the characteristics of the devices operated in parallel.

The invention has special, though not exclusive, application to ultra-high frequency generating sources, as used in television broadcasting or high-frequency heating apparatus, comprising a plurality of transmitting tubes connected in parallel and operating simultaneously into a common load or utilization circuit to obtain a desired total power output. Other uses are the operation of a plurality of loud speakers or other alternating current consuming devices from a common supply source.

Among the objects of the invention is the provision of a combining network or circuit for multiple operation of a plurality of alternating current supply or load circuits which will automatically maintain a uniform current distribution upon the parallel operated circuits; which is substantially free from interaction between the parallel operated circuits or devices; which is aperiodic in its operation and accordingly does not require tuning or adjustment to a particular operating frequency; and which is both simple in design as well as efficient and reliable in operation.

The above and further objects and novel aspects of the invention will be better understood from the following detailed description taken in reference to the accompanying drawings, forming part of this specification and in which:

Figures 1 and 2 are schematic circuit diagrams explanatory of the basic function and operation of the invention;

Figures 3, 3A, 3B and 4 schematically show various practical embodiments of combining devices or coil systems constructed in accordance with the invention;

Like reference characters identify like parts throughout the different views of the drawings.

Figures 1, 2, 3, 3A, 3B, 4, 5, 6:
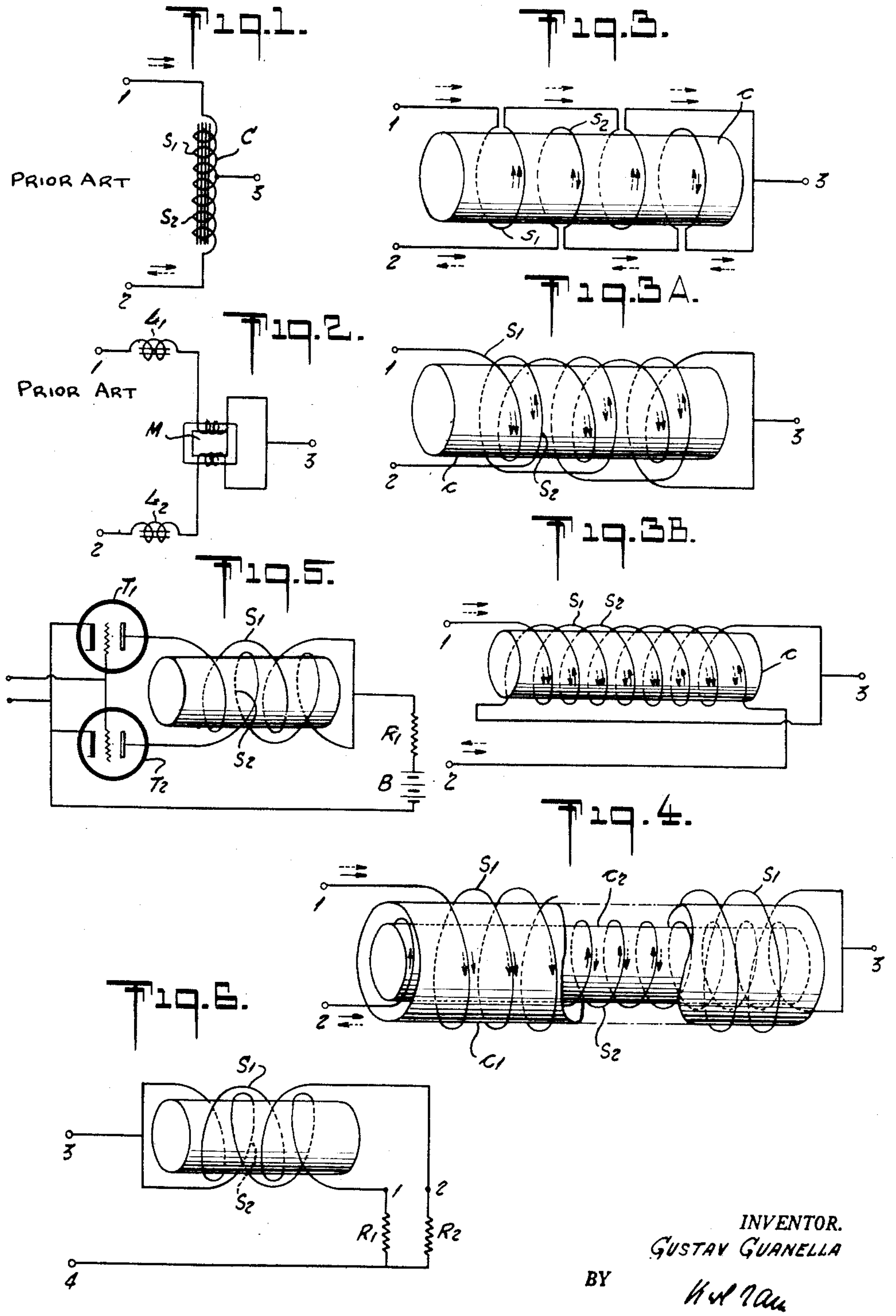
Fig. 5 illustrates a practical application of the invention embodying a pair of parallel operated electron tube amplifiers.
Fig. 6 illustrates a further application embodying a pair of parallel operated high-frequency loads.

As is well-known, a center-tapped choke coil C, Fig. 1, passes equiphased alternating currents of equal amplitude flowing from the opposite ends 1 and 2 of the coil to the central point 3 by way of the coil halves or sections $S_1$ and $S_2$, as indicated by the solid arrows in the drawing. On the other hand, unequal or oppositely-phased currents as indicated by the dashed arrows will be substantially suppressed by the inductive reactance of the coil. A minimum or complete suppression of reactance for equi-phased currents will be obtained, however, only if the two halves $S_1$ and $S_2$ are closely magnetically coupled, that is, if the leakage reactances of both sections $S_1$ and $S_2$ are a minimum or zero.

In a coil of standard construction, as indicated in the drawing, the magnetic flux of each of the coil sections $S_1$ and $S_2$ is only partially linked with the other section, whereby to result in a substantial flux leakage, as shown by the substitute diagram of Fig. 2. In the latter, M represents the mutual inductance between the sections $S_1$ and $S_2$ and $L_1$ and $L_2$ represent the leakage reactances being effectively in series with the two coil sections. As a result, in the case of equi-phased currents of equal amplitude, M does not present any reactive load, while the stray or leakage inductances $L_1$ and $L_2$ will oppose the passage of the currents and impose a considerable reactive load upon a pair of generators or supply sources connected to terminals 1 and 2.

According to the present invention, the undesirable leakage inductance is substantially reduced or suppressed by means of a specially constructed coil system, wherein the individual winding turns of both the coil sections $S_1$ and $S_2$ are arranged alternately either next to each other, Fig. 3, or in superposition, Fig. 4, in such a manner as to substantially cancel or neutralize the magnetic flux of one winding turn by the flux of the adjacent winding turn. In other words, the winding of both coil sections $S_1$ and $S_2$ are arranged in such a manner that alternate equi-phased current loops will encircle the coil axis in opposite directions, to result in a substantially complete cancelation of the magnetic field or choking effect of the coil, while alternate oppositely phased current loops passing through both coil sections will encircle the coil axis in the same direction, whereby to add to a resultant magnetic field and present a substantial inductive reactance. This effect is obtained substantially without any series or leakage reactance, due to the fact that the magnetic flux produced by each turn or elementary portion of one winding section is individually canceled or neutralized by the adjacent winding turn or elementary portion of the other coil section.

According to the construction of Fig. 3, the individual turns of the coil section $S_1$ wound in one direction are sufficiently spaced to enable the turns of the coil section $S_2$ to be wound in the opposite direction within the spaces separating the turns of the first winding section, in the manner schematically shown in and understood from the drawing. The turns of the winding sections may consist of sufficiently heavy wire to be self-supporting or they may be wound upon a suitable support, such as a laminated or powdered iron core *c* as shown in the drawing. As a consequence, alternating or high frequency currents of equal phase and amplitude which are applied to terminals 1 and 2 (solid arrows) will be readily passed to the output terminal 3, free from any reactive impedance by the coil structure, while oppositely phased currents or currents of different amplitude (dashed arrows) will result in the establishment of a considerable magnetic flux and a corresponding inductive reactance preventing the flow of currents of this character. This in turn results in a uniform distribution of the currents flowing through the branch circuits including the coil sections $S_1$, $S_2$, while at the same time avoiding undesirable resonance effects and other defects as a result of residual stray or leakage inductances.

Fig. 3A shows a somewhat modified construction of a combining coil structure according to the invention, wherein coil section $S_1$ is wound in the ordinary manner in the form of a convolute spiral upon the core C and the section $S_2$ is wound in the opposite direction by successively skipping or crossing the turns of the first section. In the drawing the cross-over portions of the section or coil $S_2$ are shown superimposed in a radial direction for better illustration. In the practical construction of the coil these portions are arranged adjacent to each other and upon the same cylindrical surface, as will be readily understood. As a result, the residual stray or leakage inductance is reduced to a negligible minimum, resulting in a complete cancellation of the magnetic field and in turn an effective conductive connection and exact equalization of equi-phased currents flowing through the branch circuits.

Referring to Fig. 3B, there is shown a further construction of a compensating or combining coil structure according to the invention. In this modification, both coil sections $S_1$ and $S_2$ are simultaneously wound upon a core *c* in the same direction to form a convolute double spiral or coiled two-wire transmission line. In order to obtain the proper phase or direction of the currents flowing in adjacent elements of both coil sections, to result in a substantial cancelation of the inductive reactance, the terminals 1 and 2 of the parallel operated devices are connected to the beginning of one coil section and to the end of the other coil section respectively, while terminal 3 connected to the common element (generator, load) is connected to both the remaining ends of the sections $S_1$ and $S_2$, in the manner shown in the drawing. There is, however, a practical limit to the use of the structure, if the length of the conductor sections becomes comparable to or exceeds the operating wave length of the system, in which case arrangements of the type according to Figures 3, 3A and 4 must be used in order to insure proper phase or direction between the currents flowing in adjacent elements of the coil sections.

Fig. 4 shows a further modification of a current equalizing coil structure according to the invention, wherein both coil sections $S_1$ and $S_2$ are wound in the form of convolute superimposed spirals of different diameters and opposite winding sense, one of the sections ($S_2$) being arranged inside the other section ($S_1$). In practice the sections $S_1$ and $S_2$ may be self-supporting or wound upon suitable supports $c_1$ and $c_2$, respectively, the former being a hollow cylinder and the latter constituting an iron core. Both coils preferably are of a diameter as close as possible, to insure a full suppression or cancelation of the inductive reactance for equi-phased currents, as will be readily understood from the foregoing.

Fig. 5 illustrates a coil according to the invention serving as a means for feeding a common load resistance $R_1$ from a pair of parallel operated vacuum tube amplifiers $T_1$ and $T_2$ having a common plate supply voltage B. In a system of this type, the alternating current load upon the tubes $T_1$ and $T_2$ will be automatically equalized and maintained even if the characteristics of the tubes differ from each other. The combining coil or network $S_1$, $S_2$ shown schematically may be constructed in accordance with any of the embodiments disclosed by the previous figures.

Fig. 6 shows an arrangement comprising a coil structure according to the invention for feeding a pair of load resistors $R_1$ and $R_2$ connected to terminals 1 and 2 by a single supply source connected to terminals 3 and 4. The action of the coil system $S_1$, $S_2$ results in the maintenance of equal load currents upon the resistors $R_1$ and $R_2$, even if the latter are variable or different from each other. The load resistors $R_1$ and $R_2$ may be in the form of a pair of high frequency heating devices as used for surface hardening of metals or dielectric heating of nonmetals, or any other alternating or high-frequency current consuming devices.

Figure 7:
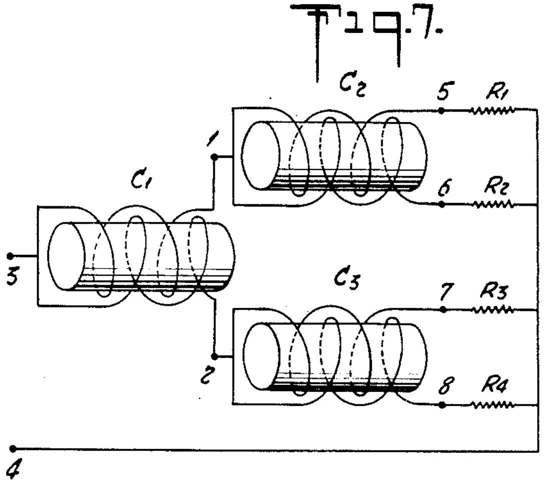
Fig. 7 illustrates a system similar to Fig. 6, designed for more than two parallel operated load or output circuits.

Fig. 7 shows an arrangement similar to Fig. 6, wherein a number of combining coils or networks according to the invention are provided for feeding a larger number of consuming devices. In the example shown, the first combining coil $C_1$ serves to maintain a uniform current distribution at the intermediate terminals 1 and 2 in substantially the same manner as in the preceding arrangement, while the further coils or networks $C_2$ and $C_3$ serve to maintain equal currents at the terminals 5, 6, 7 and 8 connected to the load resistors or consumers $R_1$, $R_2$, $R_3$ and $R_4$, respectively, and fed in parallel from a common supply source through terminals 3 and 4.

If the load resistors $R_1$, $R_2$, $R_3$ and $R_4$ were directly connected to the supply terminals 3 and 4, i. e. without the interposition of the coils $C_1$, $C_2$ and $C_3$, the consumer having the lowest resistance would obviously carry the highest current and consequently consume the highest amount of power. In an arrangement according to the invention, on the other hand, all the load currents are equal and the voltage at the consumer of lowest resistance is a minimum, whereby the latter consumes the lowest power. In the first case, where all the consumers are directly connected to the supply source, a short circuit of one consumer will react upon the entire system. In an arrangement according to the invention on the other hand, such as shown in Fig. 7, a short circuit of a single consumer will be substantially without effect, since an undesirable current rise is prevented by the equalizing action of the coils.

On the other hand, interruption or disconnection of one of the consumers $R_1$, $R_2$, $R_3$ and $R_4$ in Fig. 7 may result in dangerous excess voltages, since in this case the normal current flow continues through terminals 1 and 2. This, in turn may cause an excessive voltage rise at some of the consumers. Furthermore, variations of the resistance of the amplifiers or generators $T_1$ and $T_2$ in Fig. 5 or of the consumers $R_1$ and $R_2$ in Fig. 6 may result in a variation of the current of the generators or consumers whose resistance has remained unchanged. Thus, a variation of the resistance of $T_1$ in Fig. 5 will result in a simultaneous variation of the anode current of $T_2$. Furthermore, any non-linear effects of one of the consumers of Fig. 6 will react upon the current of the other consumer, whereby the current in the latter will no longer be linearly dependent upon the common supply current.

These phenomena and effects are in many cases undesirable. As an example, $R_1$ and $R_2$ in Fig. 6 may represent a pair of loud speakers energized from a common source by way of terminals 3 and 4. In this case, a bad speaker such as $R_1$ will react upon the other speaker $R_2$ to affect the latter's sound quality or fidelity. The same applies if one of the tubes $T_1$ and $T_2$ in Fig. 5 has a characteristic differing substantially from the characteristic of the other tube as to linearity, etc., whereby the latter may be deleteriously affected by the former on account of the rigid current distribution or equalization by the combining network. The improvements described in the following are intended to overcome this difficulty and at the same time to insure optimum matching or adaptation between the supply and load circuits.

Figure 8:
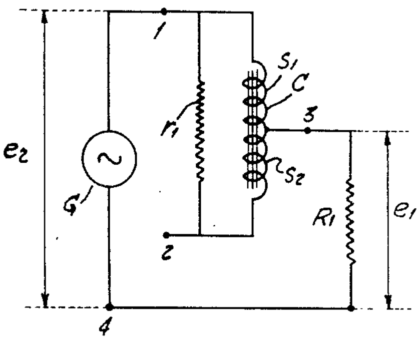
Figures 8, 9 and 10 are simple circuit diagrams explanatory of an improved feature of the invention.

Referring to the schematic diagram of Fig. 8, C is a coil according to the invention having two sections $S_1$ and $S_2$ shown adjacent to each other or separately for ease of illustration. Coil C is shunted by a resistance $r_1$ which is matched with the load resistance $R_1$ as follows:

$$r_1 = 4R_1$$

Figure 9:
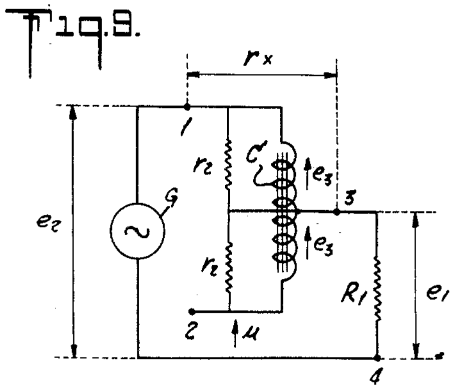

As is evident, the potential at the center 3 of coil C is equal to the potential at the center of resistance $r_1$, whereby the circuit will be equivalent to the substitute circuit shown in Fig. 9, wherein $$r_2 = \frac{r_1}{2} = 2R_1$$

Accordingly, the same voltage $e_3$ is developed across both resistors $r_2$. This in turn will be equivalent to a circuit wherein two resistors $r_2$ in shunt connection are placed between the terminals 1 and 3. As a result, resistance $r_x$ between the terminals 1 and 3 will be as follows:

$$r_x = \frac{r_2}{2} = R_1$$

In the arrangement shown wherein terminal 1 is connected to the generator G, the voltage $e_1$ between the load terminals 3 and 4 will be equal to the voltage $e_3$ between terminals 1 and 3 or:

$$e_1 = e_3 = \frac{e_2}{2}$$

Accordingly, the voltage $u$ (with reference to 4) at the open terminal 2 will be equal to zero.

Consequently, with the resistors $R_1$ and $r_1$ of Fig. 9 being designed in the manner pointed out above, any voltage applied to terminal 1 will have no effect upon terminal 2. Vice versa, a voltage applied to terminal 2 will not affect the potential at terminal 1, so that both terminals 1 and 2 of the system will be completely decoupled from each other.

The input resistance $R_i$ as seen by the terminal 1 is therefore as follows:

$$R_i = r_x + R_1 = 2R_1$$

The resistance of the generator G is adapted to or matched with this input impedance. If a second generator of equal voltage and equal internal resistance is connected to the terminal 2, Fig. 10, any voltage between terminals 1 and 2 will disappear and both generators operate in parallel, the total current being applied to the common load resistance $R_1$. In this case, the auxiliary resistance $r_1 = 2r_2$ is substantially unloaded and both generators operate in parallel upon the load $R_1$, each generator feeding a load of $2R_1$. From this it is seen, that the load of each generator is substantially independent of the presence as well as of the internal impedance of the other generator. As a result, one of the generators may be short circuited without causing reaction upon the other generators.

Figure 10:
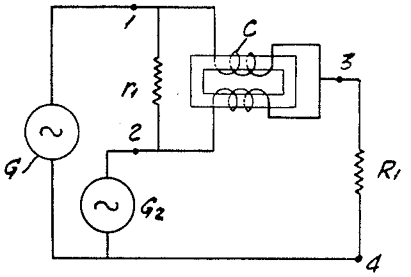

In the arrangements according to Figures 8 and 9, it was assumed that the coil system C has sufficiently low leakage inductance. For this purpose coils as constructed in accordance with the invention and shown in Figures 3, 3A, 3B and 4 are preferably used in arrangements of this type. Figure 10 shows an arrangement, wherein the coil C has a closed iron core carrying separate winding sections, to provide a minimum of leakage reactance, while the parallel resistance $r_1$ has a value four times the load resistance $R_1$, to provide a proper matching and balancing of the circuit, in a manner readily understood from the foregoing.

Figure 11:
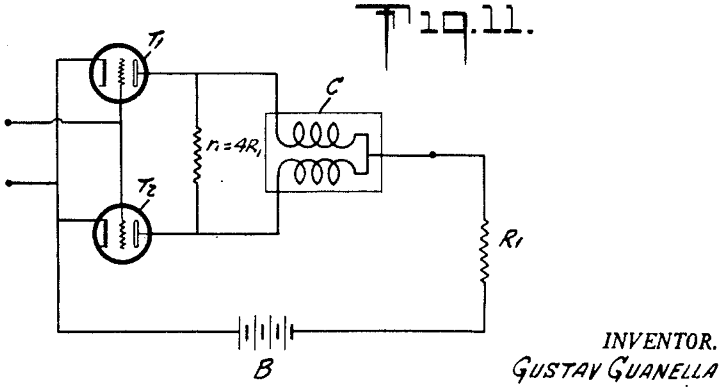
Fig. 11 is similar to Fig. 5, including the improvements according to Figures 8 to 10.

Fig. 11 shows a practical embodiment comprising a pair of amplifier tubes $T_1$ and $T_2$ controlled by a single input signal and serving to feed a common load resistance $R_1$ (antenna, heater) by way of a coil system C and balancing or matching resistance $r_1$ of the type according to the invention. As is understood, the coil system C shown schematically in the drawing may be of any of the types previously described and shown by Figures 3, 3A, 3B, 4 and 10. If the parallel resistance $r_1$ is properly dimensioned ($r_1=4R_1$), the tubes $T_1$ and $T_2$ will be substantially decoupled from each other. Both tubes supply power to the consumer $R_1$, while the parallel resistance $r_1$ normally carries no current or voltage. If the tubes have unequal characteristics, the equalizing effect of the system will prevent a mutual reaction between the tubes. Thus, one of the tubes may be short circuited or completely interrupted without any deleterious effect or reaction upon the other tube. In this case, the resistor $r_1$ will merely be subjected to the equalizing power or current due to differences in the characteristics or output voltages of the tubes.

Figure 12:
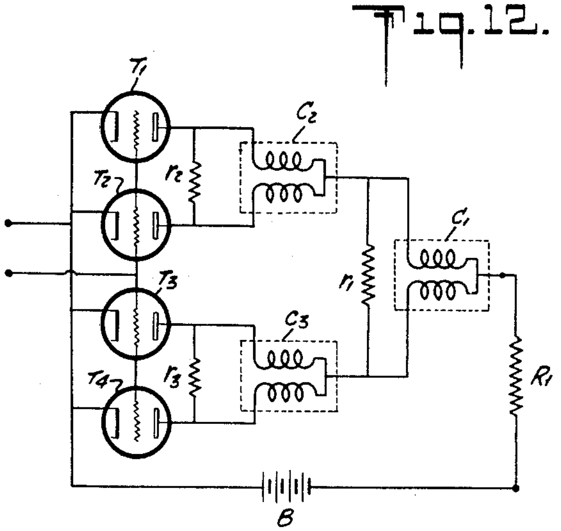
Fig. 12 shows a system similar to Fig. 11 embodying more than two parallel operated amplifier tubes.

Systems according to Fig. 11 may also be used in cascade for a greater number of generators, such as vacuum tube amplifiers as shown in the drawing. Thus referring to Fig. 12, four tubes $T_1$, $T_2$, $T_3$ and $T_4$ are shown operated in parallel, whereby the coil systems $C_2$ and $C_3$ serve to equalize the currents of the tubes $T_1$, $T_2$ and $T_3$, $T_4$, respectively. The common output currents of each pair of tubes are in turn equalized by the coil system $C_1$ and applied to the consumer $R_1$. All the coils $C_1$, $C_2$ and $C_3$ are shunted by matching or decoupling resistors $r_1$, $r_2$ and $r_3$, respectively. Again, resistance $r_1$ is determined by the following relation:

$$r_1=4r_1$$

The load resistance at the output of the two systems $C_2$ and $C_3$ resulting from $R_1$ and $r_1$ is then equal to $2R_1$. The compensating resistors $r_2$ and $r_3$ again are four times this value, i. e.:

$$r_2=r_3=4.2R_1=8R_1$$

The internal resistances of the tubes or generators $T_1-T_4$ in turn are ½ of the compensating resistors, i. e.:

$$R_i=\frac{r_2}{2}=\frac{r_3}{2}=4R_1$$

In the normal operation of the tubes or generators having exactly identical characteristics, no current passes through the equalizing resistors $r_2$ and $r_3$ and the coil systems $C_1$ and $C_2$ practically present no reactive loads, whereby all four tubes operate in parallel upon the common load resistance $R_1$.

Figure 13:
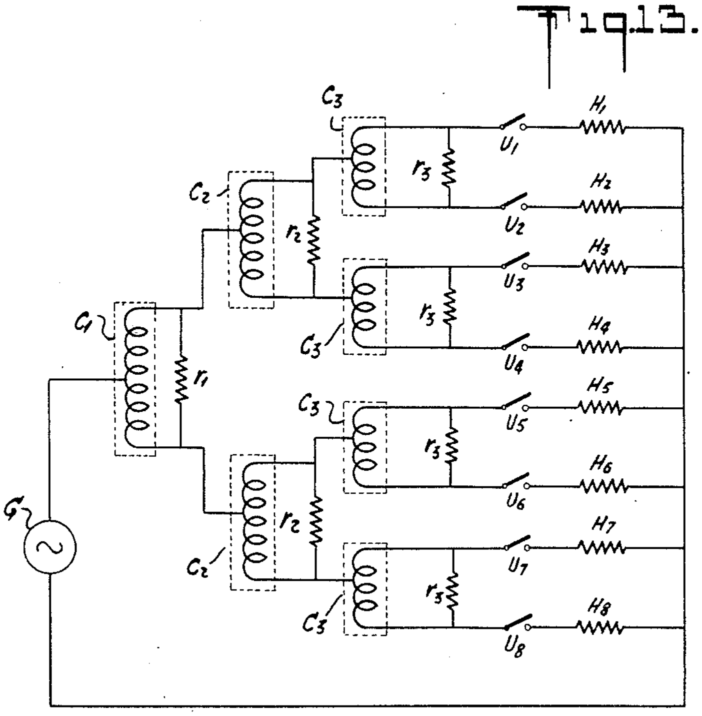
Fig. 13 illustrates a system similar to Fig. 7, embodying a plurality of load circuits and including the improved feature according to Figures 8 to 10.

Coil systems constructed in accordance with the invention in combination with parallel or equalizing resistors may also be used for feeding a plurality of load or consuming devices by a common supply source, in the manner shown in Fig. 13. In the latter the coil systems are indicated schematically by normal coils as shown in Fig. 1, for simplicity of illustration, it being understood that coils are constructed in accordance with the invention and described hereinabove.

Fig. 13 shows a system comprising eight consumers $H_1$, $H_2$ . . . $H_8$ which may be high frequency heating devices or other consumers supplied from a common generator or supply source G. Each pair of consumers $H_1$ to $H_8$ are at first connected through switches $U_1$ to $U_8$ with a number of coil systems $C_3$ each provided with a shunt or equalizing resistance $r_3$. Adjacent pairs of coil systems $C_3$ are in turn connected to similar systems $C_2$ having shunt or equalizing resistors $r_2$. Systems $C_2$ are then connected to the coil systems $C_1$ having an equalizing resistor $r_1$, in the manner shown in the drawing and readily understood from the foregoing.

Assuming the resistance of each consumer to be $R_1$ according to the above, then $r_1$ will be equal to $4R_1$ and $r_2$ will be equal to $8R_1$, from which it follows that $r_3$ will be equal to $16R_1$. In this case, all the load resistors $H_1$ to $H_8$ will be substantially decoupled, since an internal voltage of $H_1$ will be substantially without influence upon $H_2$. If each of the consumers have a resistance of $8R_1$ with $R_1$ representing the resistance of G, then the generator and load will be properly matched and no current will flow through the equalizing resistors $r_1$, $r_2$ and $r_3$. In case of a short circuit or interruption of an individual consumer, no inadmissible excess currents or voltages will occur in the remaining consumers.

As a result, arrangements of the above type are especially suited for cases where a plurality of consumers subject to frequent service interruptions and disturbances are to be supplied from a common source G. In the latter case, disturbances in one consumer circuit will not affect or react upon the neighboring consumers. Furthermore, distortion effects within one of the consumers due to non-linear characteristics or the like will be without effect upon the neighboring consumers. In this manner it is possible to feed a plurality of high frequency heating devices from a single generator G, whereby the disconnection of one of the devices will be without effect upon the remaining devices. In a similar manner a number of loud speakers may be energized from a single amplifier or a plurality of antennae may be supplied from a single transmitter such as in care of directional transmission systems. In all such cases the currents applied to the individual output or load devices will be maintained constant or equalized, substantially independently of variations of the currents or internal characteristics of the neighboring devices, in the manner understood from and explained in the foregoing.

While there have been shown and described a few desirable embodiments of the invention, it will be evident from the foregoing that changes in the size, shape and arrangements of parts, as well as the substitution of equivalent elements for those shown and disclosed herein, may be made without departingt from the scope and spirit of the invention as defined in the appended claims. The specification and drawings are accordingly to be regarded in an illustrative rather than in a limiting sense.

I claim:

1. In an electrical network comprising a pair of devices supplying in-phase alternating currents and a common load fed by said devices in parallel, means for maintaining substantially equal load currents supplied by said devices comprising a pair of induction coils each inserted in series with one of said devices, said coils being wound with each of the successive winding turns of one coil arranged parallel and closely adjacent to the corresponding turn of the other coil and the relative winding sense of the coils being such as to cause the currents through the corresponding adjacent turns of the coils to flow in opposite directions, to substantially cancel the individual magnetic flux linked with each turn of one coil by the individual magnetic flux linked with the corresponding adjacent turn of the other coil.

2. An electrical network comprising a pair of devices supplying in-phase alternating currents, a load, circuit connections from both of a pair of equi-phased terminals of said sources to one terminal of said load, a pair of induction coils having input terminals each connected to one of the remaining terminals of said devices and output terminals both connected to the remaining terminal of said load, said coils being wound with each of the successive winding turns of one coil arranged parallel and closely adjacent to the corresponding turn of the other coil and the relative winding sense of the coils being such as to cause the currents through the corresponding adjacent turns of the coils to flow in opposite directions, to substantially cancel the individual magnetic flux linked with each turn of one coil by the individual magnetic flux linked with the corresponding adjacent turn of the other coil.

3. An electrical network comprising a pair of devices supplying in-phase alternating currents, a load having a resistance equal to one-half of the internal resistance of said devices, circuit connections from both of a pair of equi-phased terminals of said devices to one terminal of said load, a pair of induction coils having input terminals each connected to one of the remaining terminals of said devices and output terminals both connected to the remaining terminal of said load, said coils being wound with each of the successive winding turns of one coil arranged parallel and closely adjacent to the corresponding turn of the other coil and the relative winding sense of the coils being such as to cause the currents through corresponding adjacent turns of the coils to flow in opposite directions, to substantially cancel the individual magnetic flux linked with each turn of one coil by the individual magnetic flux linked with the corresponding adjacent turn of the other coil, and a decoupling resistor having a value equal to four times said load resistance connected between the input terminals of said coils.

4. An electrical network comprising a pair of devices supplying in-phase alternating currents, a load having a resistance equal to one-half of the internal resistance of said devices, circuit connections from both of a pair of equi-phased terminals of said devices to one terminal of said load, a pair of induction coils having input terminals each connected to one of the remaining terminals of said devices and output terminals both connected to the remaining terminal of said load, said coils being disposed in mutual coupling relation to one another and having a relative winding sense to cause the magnetic flux linked with one coil to substantially balance the magnetic flux linked with the other coil, and a decoupling resistor having a value equal to four times said load resistance connected between the input terminals of said coils.

References Cited in the file of this patent

UNITED STATES PATENTS

| | | |
|---|---|---|
| 1,417,710 | Ballman | May 30, 1922 |
| 2,082,121 | Rypinski | June 1, 1937 |
| 2,082,122 | Rypinski | June 1, 1937 |
| 2,368,857 | McClellan | Feb. 6, 1945 |
| 2,434,822 | Van Beuren et al. | Jan. 20, 1948 |
| 2,509,057 | Guanella | May 23, 1950 |